(12) United States Patent
Kobayashi (10) Patent No.: US 7,129,474 B2
(45) Date of Patent: Oct. 31, 2006

(54) UNIT FOR SCANNING AN IMAGE AND AN IMAGE FORMING APPARATUS FOR USING IT

(75) Inventor: Shigeo Kobayashi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 10 days.

(21) Appl. No.: 10/890,985

(22) Filed: Jul. 15, 2004

(65) Prior Publication Data

US 2005/0040324 A1 Feb. 24, 2005

(30) Foreign Application Priority Data

Jul. 17, 2003 (JP) .............................. 2003-198593

(51) Int. Cl.
*H01J 3/14* (2006.01)
*H01J 5/16* (2006.01)
*H01J 40/14* (2006.01)
*G02B 7/02* (2006.01)
*G02B 15/14* (2006.01)

(52) U.S. Cl. .................... 250/234; 359/811; 359/819; 359/704

(58) Field of Classification Search ................ 250/216, 250/234; 359/811, 819, 703, 704
See application file for complete search history.

(56) References Cited

U.S. PATENT DOCUMENTS

| 4,473,746 A * | 9/1984 | Edmonds ..................... 250/216 |
| 6,404,939 B1 * | 6/2002 | Wada .......................... 382/312 |
| 2002/0018306 A1 * | 2/2002 | Andoh et al. ............... 359/819 |
| 2004/0223068 A1 * | 11/2004 | Kamo ........................ 348/335 |

* cited by examiner

Primary Examiner—Stephone B. Allen
Assistant Examiner—Suezu Ellis
(74) Attorney, Agent, or Firm—Oblon, Spivak, McClelland, Maier & Neustadt, P.C.

(57) ABSTRACT

An image scanning unit includes at least two lens groups for imaging a reflected image of a manuscript on a lined photoelectric conversion element (12), lens barrels (14, 15) for holding the lenses, respectively, and constituting an imaging lens system (16), a base member (10) on which the lined photoelectric conversion element (12) and the lens barrels (14, 15) are disposed, and intermediate holding members (13, 19) for mounting at least one of the lens barrels (14) and the lined photoelectric conversion element (12) on the base member (10).

7 Claims, 7 Drawing Sheets

UNIT FOR SCANNING AN IMAGE AND AN IMAGE FORMING APPARATUS FOR USING IT

CROSS REFERENCE TO RELATED APPLICATION

BACKGROUND OF THE INVENTION

The application claims the priority benefit of Japanese Patent Application No. 2003-198593 filed on Jul. 17, 2003.

1. Field of the Invention

The present invention relates to an improvement in an image scanning unit and an image forming apparatus for using it, which has a simple structure and an easy assembly and is capable of enhancing accuracy of image scanning.

2. Description of Related Art

Conventionally, it has been known an image scanning unit, which has an imaging lens system including lenses more than 1 group. In the conventional image scanning unit, an illuminating light source of a manuscript is moved in the sub scanning direction, and the reflected light from the manuscript is reduced and imaged on a lined photoelectric conversion element through the imaging lens system, and then a luminous flux imaged on the lined photoelectric conversion element is photo-electrically converted to be output as an image scanning signal.

In this image scanning unit, if the imaged luminous flux is deviated from the light receiving surface of the lined photoelectric conversion element in the optical axis direction, the scanning image is deteriorated. A distance between lenses is therefore adjusted in order for the scanning image to meet a drafting standard by adjusting a distance of each lens group in the image scanning unit.

Figure 1:
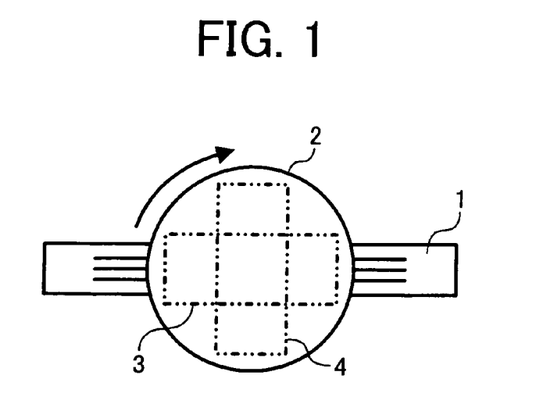
FIG. 1 is an explanation view describing the relationship between a lens and a lined photoelectric conversion element.

Moreover, in the image scanning unit, the portion of a lens 2 contributing to the imaging of the lined photoelectric conversion element is the portion of area 3 which is surrounded by dotted lines, as shown in FIG. 1. The imaging performance such as aberration in the portion of the area 3 is scattered in the turning direction of the lens. Even thought the lens 2 is set such that the portion of the area 3 becomes parallel to the lined photoelectric conversion element 1, and the distance between the lens 2 and the lined photoelectric conversion element 1 is adjusted in order for the imaging position of the imaged luminous flux to be parallel to the lined photoelectric conversion element 1, if the portion of the area 4 is set to be parallel to the lined photoelectric conversion element 1, the imaging position of the imaged luminous flux may be deviated from the light receiving surface of the lined photoelectric conversion element 1 in the optical axis direction, and deterioration in an image quality is caused.

Especially for a lens used in an image scanning unit for scanning a color image, if an imaging position among a blue wavelength, a green wavelength, and a red wavelength is deviated in the turning direction of the lens, a color image is not well reproduced. Therefore, it is also necessary to adjust a lens in the turning direction.

In order to improve an image quality by adjusting the distance between lenses and the turning direction of lens, there has been known a conventional image scanning unit (For example, JPA-H11-337799). In such an image scanning unit, one lens barrel is divided into two lens barrels, and each lens is held by both of the divided lens barrels. Screw portions are formed in the circumference of one divided lens barrel and in the inner circumference of the other divided lens barrel, and then both of the screw portions are screwed together, and the distance between lens groups are adjusted by turning both of the divided lens barrels.

However, in this related art, if the distance between the lens groups held by each divided lens barrel is adjusted, each lens group is turned with the turning of the divided lens barrel. Therefore, there was a problem that the turning of the lens group and the adjustment of the distance are not separately carried out.

Moreover, in this related art, in order to prevent the winding down of the screw portions, a guide portion of turning direction is provided in the divided lens barrel. However, if the axis core of the guide portion and the optical axis center of the lens are decentered, the optical axis center is turned about the axis core of the guide portion with the turning of the divided lens barrel. An extremely accurate lens barrel should be manufactured in order to avoid such turning, but the manufacture of the extremely accurate lens barrel is difficult because the lens barrel shape is increasingly complicated.

SUMMARY OF THE INVENTION

The present invention has been made in view of the above problems, and an object of the present invention is to provide an image scanning unit and an image forming apparatus for using it, which can separately perform turning of lens barrels and adjusting a distance between the lens barrels with a simple structure without complicating the structure of the lens barrel.

In order to achieve the above object, according to one feature of the present invention, an image scanning unit comprises at least two lens groups for imaging a reflected image of a manuscript on a lined photoelectric conversion element, lens barrels for holding the lenses, respectively, and constituting an imaging lens system, a base member on which the lined photoelectric conversion element and the lens barrels are disposed, and intermediate holding members for mounting at least one of the lens barrels and the lined photoelectric conversion element on the base member.

According to another feature of the present invention, an image scanning unit comprises an imaging lens including a plurality of lens groups for imaging a reflected image of a manuscript, a photoelectric conversion element for photo-electrically converting the image of the manuscript imaged by the imaging lens, a base member for holding the imaging lens and the photoelectric conversion element, and a positioning mechanism capable of positioning at least one of the plurality of lens groups in a biaxial direction along the base member, at least one of the plurality of lens groups comprising a necked lens group, the positioning mechanism being adjustable a position of at least one of the plurality of lens groups relative to the other lens group or the photoelectric conversion element.

According to another feature of the present invention, an image scanning unit comprises an imaging lens including a plurality of lens groups for imaging a reflected image of a manuscript, a photoelectric conversion element for photo-electrically converting the image of the manuscript imaged by the imaging lens, a base member for holding the imaging lens and the photoelectric conversion element, and a positioning mechanism capable of positioning at least one of the plurality of lens groups in a biaxial direction along the base member, at least one of the plurality of lens groups comprising a naked lens group, the positioning mechanism being adjustable a position of at least one of the plurality of lens groups relative to the other lens group or the photoelectric conversion element.

According to further another feature of the present invention, an image scanning unit comprises an imaging lens including a plurality of lens groups for imaging a reflected image of a manuscript, a photoelectric conversion element for photo-electrically converting the image of the manuscript imaged by the imaging lens, a base member for holding the imaging lens and the photoelectric conversion element, and a positioning mechanism capable of positioning at least a part of the plurality of lens groups in a biaxial direction along the base member, at least a part of the lens group comprising a naked lens group, the other part of the lens group comprising a lens group held by a lens barrel, the positioning mechanism being adjustable at least a position of the naked lens group relative to the photoelectric conversion element or the lens group held by the lens group.

DETAILED DESCRIPTION OF THE PREFERRED EMBODIMENTS

Hereinafter, embodiments of an image scanning unit according to the present invention will be described with reference to the accompanying drawings.

(First Embodiment)

Figure 2:
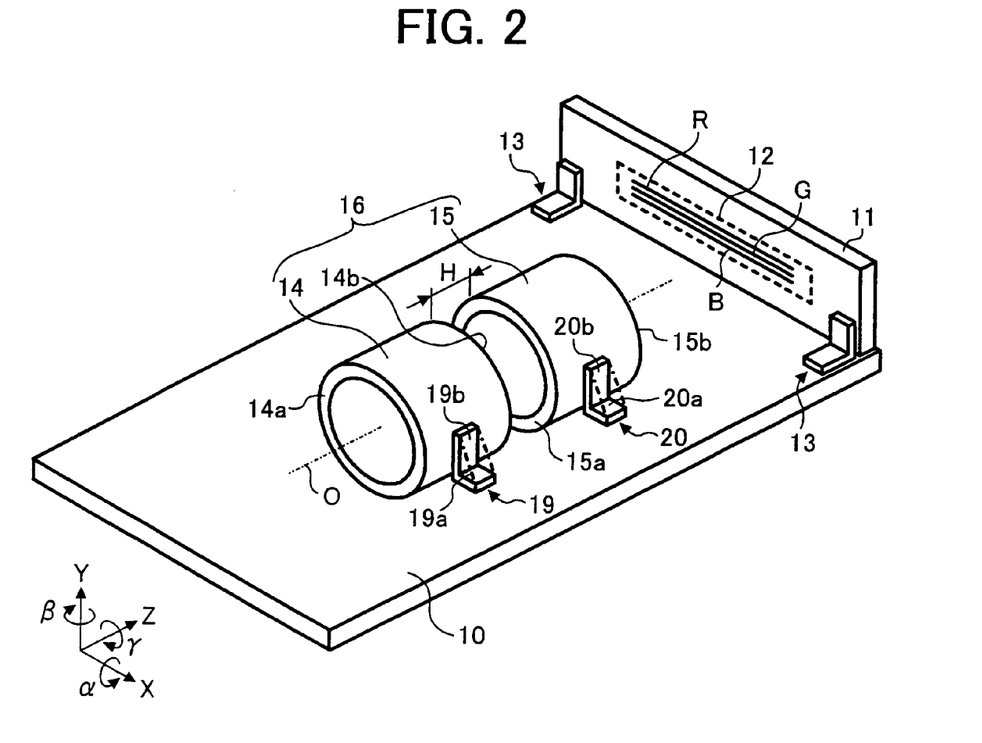
FIG. 2 is a perspective view illustrating a schematic structure of first embodiment of an image scanning unit according to the present invention.

FIG. 2 illustrates a first embodiment of an image scanning unit according to the present invention.

The image scanning unit in the first embodiment illustrated in FIG. 2 is provided with a base member 10 and a photoelectric conversion element 11 which is positioned on the base member 10. The photoelectric conversion element 11 comprises a lined photographic conversion element 11. The lined photoelectric conversion 12 is made of picture element lines of each photoelectric conversion arrangement element such as R (Red), G (Green), and B (Blue). The image pickup device unit 12 is fixed onto the base member 10 by using a pair of intermediate holding members 13, 13.

A lens barrel 14 and a lens barrel 15 adjacent to the lens barrel 14 are arranged on the base member 10. The lens barrels 14, 15 are provided with at least one lens group. An imaging lens system 16 for reducing reflected light from a manuscript (not shown) and for imaging the reduced reflected light onto the lined photoelectric conversion element 12 is constructed by the lens barrels 14, 15.

Figure 3:
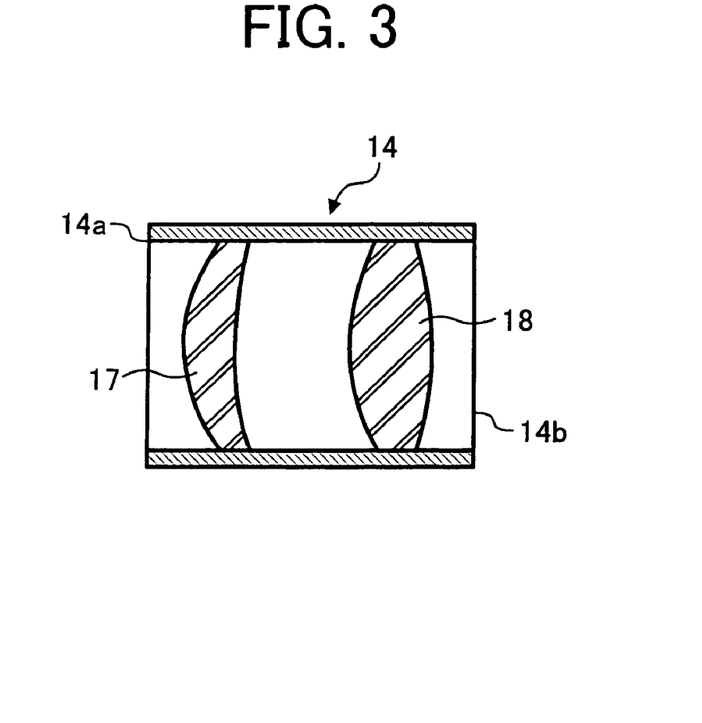
FIG. 3 is a cross-section structural view illustrating an example of the lens barrel shown in FIG. 2.

Here, lens groups 17, 18 are held in the lens barrel 14 as illustrated in FIG. 3. The lens barrel 14 is positioned in the manuscript side, and the lens barrel 15 is positioned in the imaging side. A forward end portion 14a of the lens barrel 14 is faced to the manuscript side, and a back end portion 14b of the lens barrel 14 is faced to a forward end portion 15a side of the lens barrel 15. A back end portion 15b of the lens barrel 15 is faced to the lined photoelectric conversion element 12 side.

The forward end portion 14a of the lens barrel 14 is projected forwardly of the surface of the lens group 17, and the back end portion 14b of the lens barrel 14 is projected backwardly of the surface of the lens group 18.

In the lens barrels 14, 15, one lens barrel is divided into two lens barrels, so that the weight is saved compared to the conventional one lens barrel. It is preferable for the lens barrels 14, 15 to be made of synthetic resin. If the lens barrels 14, 15 are made of synthetic resin as stated, the weight of the lens barrels are further saved.

In the conventional metal lens barrel, there may be possibility that a lens group is scratched. However, the lens barrels 14, 15 can avoid scratching the lens groups because the lens barrels 14, 15 are made of resin. In case of using the conventional metal lens barrier, a space is provided between the outside diameter of the lens and the internal diameter of the lens barrel in order to avoid scratching the lens group when pressing the lens group into the lens barrel. By providing the gap, the lens group was facilitated to be inserted into the lens barrel, so that there was possibility that an axis positional accuracy for attaching the lens group is deteriorated. However, if the lens barrels 14, 15 are made of synthetic resin, the lens group is positioned and fixed to the lens barrel by pressing means without being scratched, and the axis positioning accuracy for attaching the lens group to the lens barrel is further improved.

In this case, if the same synthetic resin used for the lens barrel 14 is used for the lens groups 17, 18, the lens barrel 14 and the lens groups 17, 18 can be decomposed without separating the lens barrel 14 and the lens groups 17; 18 for recycling, so that the recycling efficiency is further improved.

When the lens groups 17, 18 and the lens barrel 14 are manufactured by using the same synthetic resin material, resin material having high penetration efficiency is used by filling black pigment into the resin material having high penetration efficiency in terms of providing light blocking effect for the lens barrel 14. The same material is used for the lens barrel 15.

Figure 4:
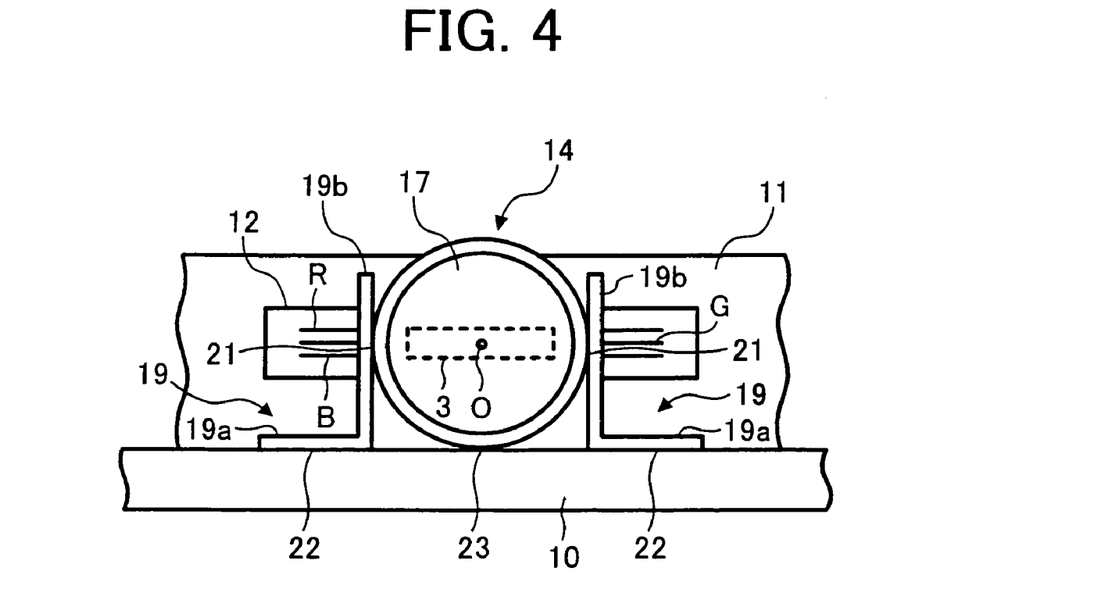
FIG. 4 is a view illustrating the image scanning unit shown in FIG. 2 seen from a front face.

The lens barrels 14, 15 are positioned and fixed onto the base member 10 via a pair of intermediate holding members 19, 19 and a pair of intermediate holding members 20, 20 which sandwich an optical axis O of the imaging lens system

16, as illustrated in FIG. 4. The intermediate members 19, 20 are made of base plate portions 19a, 20a and standing plate portions 19b, 20b.

In an example, the lens barrels 14, 15 are positioned as follows.

Firstly, the lens barrel 14 is positioned in the previously designed position on the base member 10 in such that with respect to the lined photoelectric conversion element 12, the axis core of the lens barrel 14 is aligned with the optical axis O of the imaging lens system 16 and the axis core is positioned in the center in the direction extending the lined photoelectric conversion element 12. For this positioning, the lens barrel 14 is turned and adjusted in the directions arrows α, β by using for example an assembly robot (not shown). The lens barrel 14 is turned in the direction γ of the optical axis O in order for the area 3 having the smallest aberration on the lined photoelectric conversion element 12 to be a parallel to the direction extending the lined photoelectric conversion element. Whether or not the aberration is in a standard can be judged by processing and evaluating the image signal output from the lined photoelectric conversion element 12 with a signal processing circuit (not shown).

With this state, ultraviolet-curing adhesive 21 is applied to circumference of the lens barrel 14 while a pair of intermediate holding members 19, 19 is set on the base member 10 by applying ultraviolet-curing adhesive 22 on base plate portions 19a, 19a of a pair of intermediate holding members 19, and standing plate portions 19b, 19b of a pair of intermediate holding members 19, 19 strike against the circumference of the lens barrel 14 as to sandwich the lens barrel 14 by the standing plate portions 19b, 19b. The ultraviolet-curing adhesive 21, 22 is hardened by irradiating ultraviolet with an ultraviolet-irradiation device (not shown). The lens barrel 14 is thereby fixed onto the previously designed position. It is preferable for the intermediate holding members 19, 19 to be manufactured by using ultraviolet transmission type resin.

Secondly, the lens barrel 15 is disposed onto the base member 10. The axis core of the lens barrel 15 is aligned with the optical axis O of the imaging lens system 16, and the lens barrel 15 is turned about the optical axis O (in the direction arrow γ) by using an assembly robot (not shown). Accordingly, a turning position with good aberration can be determined as the imaging lens system 16. Next, the distance H between the lens barrel 15 and the lens barrel 14 are adjusted. The aberration of field curvature is thereby corrected, and then the lens barrel 15 is fixed onto the base member 10 by using the intermediate holding member 20 and the ultraviolet-curing adhesive 21, 22. Here, the lens barrels 14, 15 are fixed onto the base member 10 by using ultraviolet-curing adhesive 23 between the base member 10 and the lens barrels 14, 15.

As described above, according to the above embodiment of the present invention, the respective lens barrels 14, 15 can be independently turned. The distance H of the lens barrels 14, 15 can be adjusted independent from the turning of the lens barrels 14, 15, so that aberration and field curvature are smoothly corrected, and then the image quality can be improved.

According to the embodiment of the present invention, the lens groups 17, 18 are respectively disposed inside the forward end portion 14a and the back end portion 14b of the lens barrel 14, as shown in FIG. 3; therefore, scratches for the lens groups 17, 18 can be prevented even when the lens barrel 14 is laid during the assembly operation. The same structure is given for the lens barrel 15. In the embodiment of the present invention, both of the lens groups 17, 18 are disposed back portion of the lens barrel, but only one of the lens groups may be disposed back portion of the lens group.

The above image scanning unit is incorporated into a copying machine for scanning an optical image, a facsimile device, a scanning device and the like.

Figure 5:
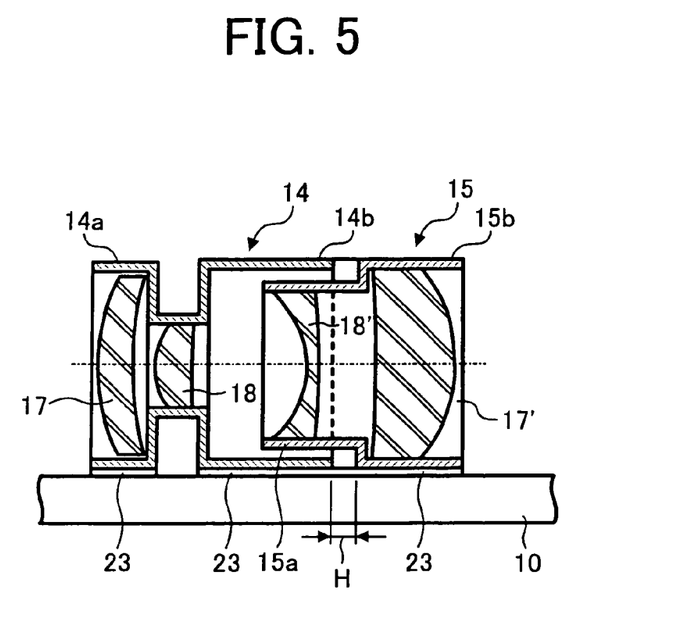
FIG. 5 is a cross-section view describing a modification example of the lens barrel shown in FIG. 2.

As shown in FIG. 5, if the back end portion 14b of the lens barrel 14 of the manuscript side and the forward end portion 15a of the lens barrel 15 of the imaging side are overlapped, and the forward end portion 15a is surrounded by the back end portion 14b, the exposure reflected light from the manuscript side can be controlled to be entered in the lens barrel 15 from the gap of the distance H between the lens barrel 14 and the lens barrel 15 as stray light.

Figure 6:
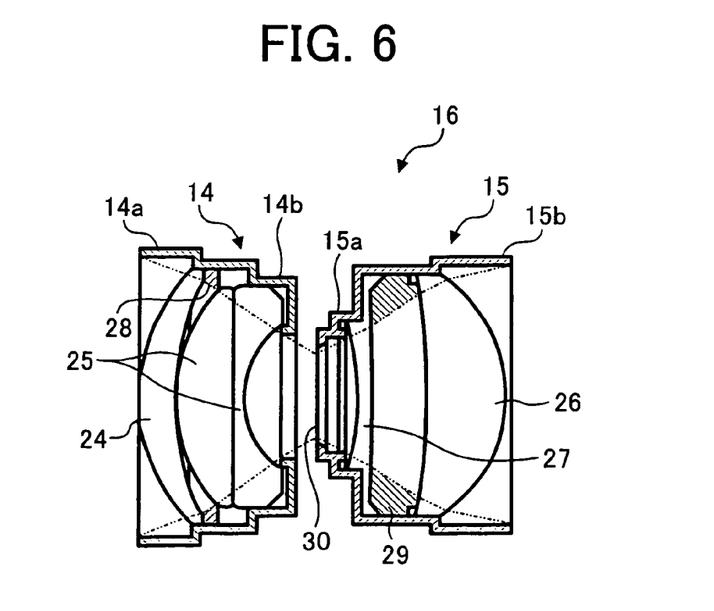
FIG. 6 is a cross-section view describing another modification example of the lens barrel shown in FIG. 2.

The imaging lens system 16 as shown in FIG. 6 comprises the structure of four lens groups. With this, the lens groups 24, 25 are held by the lens barrel 14, and the lens groups 26, 27 are held by the lens barrel 15. The lens group 25 is composed of a cemented lens in which two lenses are cemented. Here, a distance adjusting ring (spacer ring) 28 for adjusting the distance between the lens group 24 and the lens group 25 is disposed in the lens barrel 14, and also a distance adjusting ring (spacer ring) 29 for adjusting the distance between the lens group 26 and the lens group 27 is disposed in the lens barrel 15 in order to improve the positioning accuracy of the distance in the axis direction between the lens group 24 and the lens group 25, and the distance in the axis direction between the lens group 26 and the lens group 27. Accordingly, the relative position accuracy can be improved even when the lens group is more than 3 lens groups.

Here, an aperture stop 30 is integrally disposed in the forward end portion 15a of the lens barrel 15 between the lens barrel 14 and the lens barrel 15. In case of the conventional one metal (aluminum) lens barrel, a resin aperture stop is mounted on the forward end portion of the lens barrel. When the lens barrel is made of synthetic resin material with the structure which divides the lens barrel into two lens barrels as described above, the aperture stop is integrally formed with the lens barrel 15, so that the number of parts such as the aperture stop can be reduced. The aperture stop 30 may be disposed in the back end portion 14a of the lens barrel 14, or may be integrally formed between the lens group 27 and the lens group 28.

Figure 7:
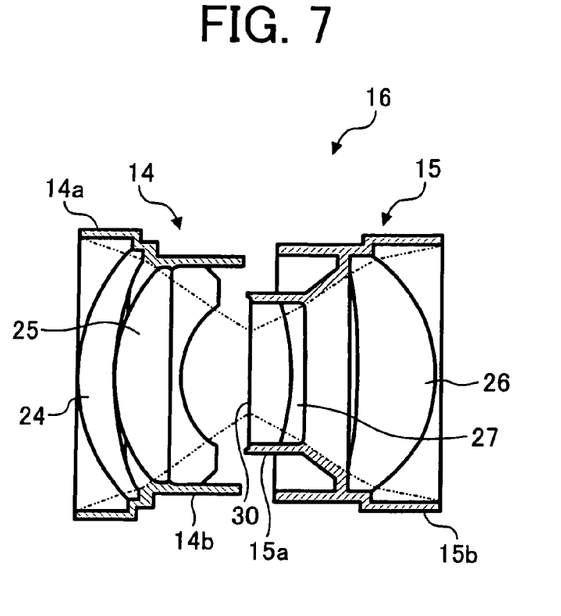
FIG. 7 is a cross-section view describing further another modification example of the lens barrel shown in FIG. 6.
Figure 8:
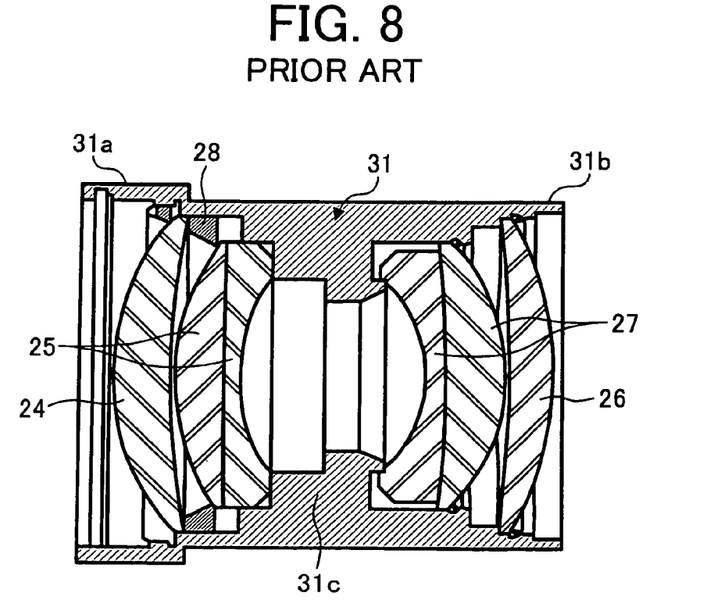
FIG. 8 is a cross-section view describing failure of a conventional non-divided lens barrel.

The distance adjusting rings 28, 29 way be integrally formed in the inner circumference of the lens barrels 14, 15 in the direction around the circumference as shown in FIG. 7. In case of the conventional non-divided type lens barrel 31 with four lens groups, if the distance adjusting ring 28 is integrally disposed in the lens barrel 31, the lens group 25 positioned in the back side can not be inserted from a forward end portion 31a of the lens barrel 31, as shown in FIG. 8. Moreover, when the lens group 25 is inserted from the back end portion 31b, the lens group 25 can not be inserted because of the interruption of a boundary portion 31.

In case of the divided lens barrel holding the two lens groups such as the lens groups 24, 25, however, one lens group 24 can be inserted from the forward end portion 14a of the lens barrel, and the other lens group 25 can be inserted from the back end portion 14b of the lens barrel 14. When the lens is incorporated into the lens barrel 14, the assembly process and the number of parts are thereby reduced. The same structure is applied to the lens barrel 15.

Figure 9:
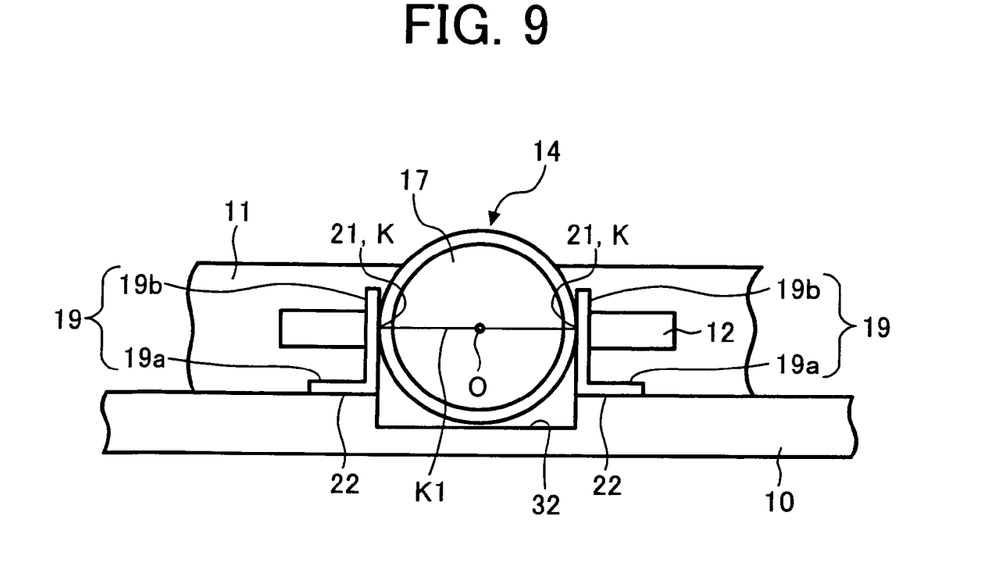
FIG. 9 is a front view illustrating a schematic structure of second embodiment of an image scanning unit according to the present invention.
Figure 10:
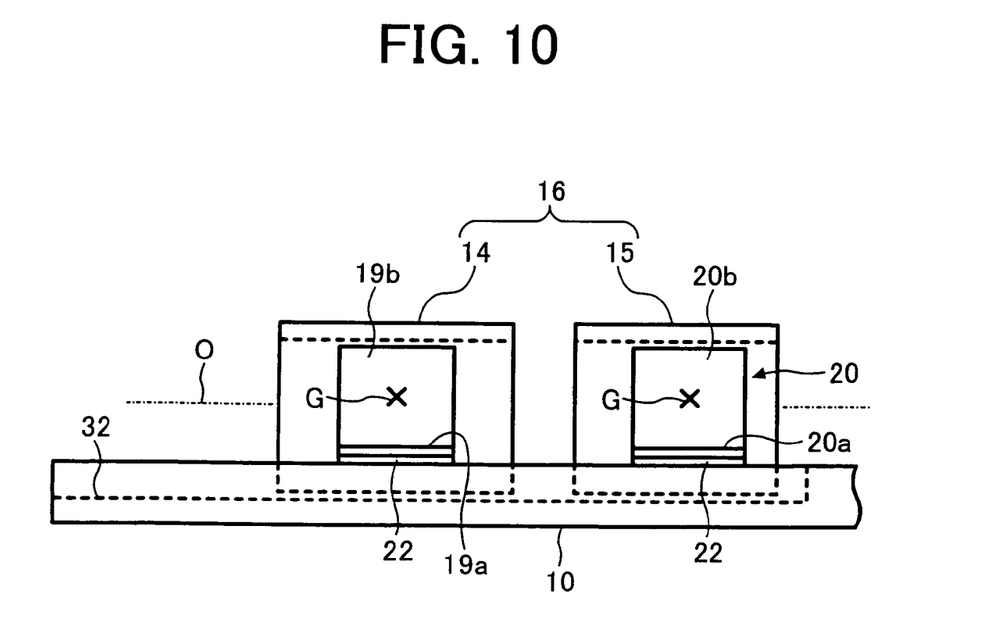
FIG. 10 is a side view of an image scanning unit shown in FIG. 9.

FIGS. 9, 10 illustrate the second embodiment of the image scanning unit according to the present invention. With this embodiment, the image scanning unit may have a construction in which a concave portion 32 is formed on a base member 10, and the lens barrels 14, 15 are held in a floating state relative to the base member 10 via a pair of the intermediate holding members 19, 19.

In this construction, the base member 10 and the lens barrel 14 are grasped by an assembly robot. First, the lens barrel 14 is turned to set the relative position with respect to the base member 10. After the image scanning unit becomes a state that the intermediate holding member 19 is placed to the base member 10 by contacting to the outer circumference of the lens barrel 14. The ultraviolet-curing adhesive 21, 22 are previously applied to the base plate portion and the standing plate portion of the intermediate holding member 19. When ultraviolet is irradiated, the ultraviolet-curing adhesive 21, 22 is hardened and shrunk by the irradiation of the ultraviolet. The intermediate holding member 19 follows with respect to the base member 10 and the lens barrel 14, so that the strain caused by the hardening and the shrinking can be reduced.

Thinner film thickness of the ultraviolet-curing adhesive 22 between the base member 10 and the base plate portion 19a and thinner film thickness of the ultraviolet-curing adhesive 21 between the standing plate portion 19b and the circumference portion of the lens barrel 14 can reduce the amount of hardening and shrinking of the adhesive. Consequently, the positioning accuracy and the fixing performance are improved. The lens barrel 15 is fixed onto the base member 10 through the intermediate holding member 20 by the same described above.

In this case, it is preferable for the line K1 connecting the adhesion spots K,K of the lens barrel 14 by a pair of the intermediate holding members 19, 19 to pass the center of gravity G of the lens barrel 14, and to be orthogonal to the optical axis O of the imaging lens system 16. It is also preferable for the line K1 to be a parallel to the image pixel lines R, G, and B. With this construction, the earthquake protection of the lens barrel 14 is improved. The same construction for the lens barrel 15 is preferable.

Figure 11:
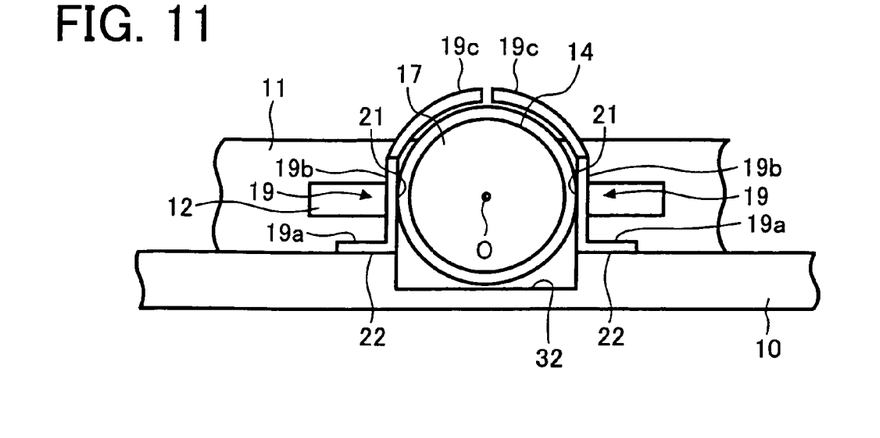
FIG. 11 is a front view illustrating a schematic structure of third embodiment of an image scanning unit according to the present invention.
Figure 12:
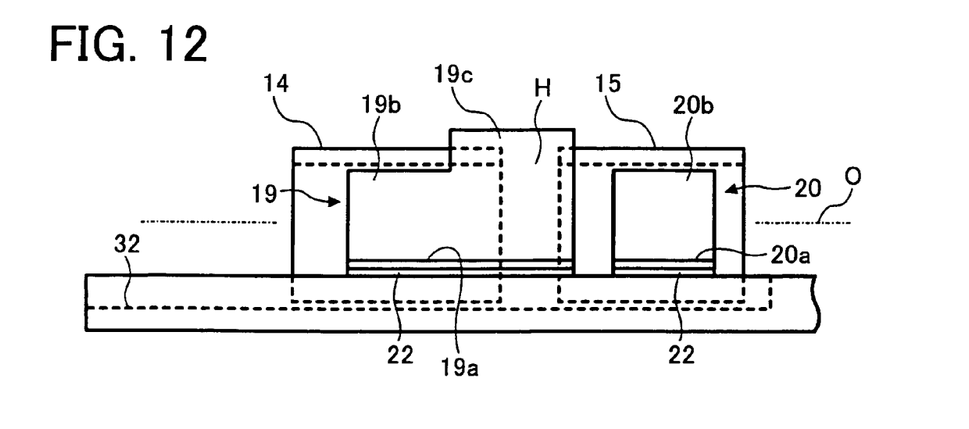
FIG. 12 is a side view of the image scanning unit shown in FIG. 11.

FIGS. 11, 12 show the third embodiment of the image scanning unit according to the present invention. The image scanning unit in this embodiment may be configured to cover the gap which is the distance H between the lens barrel 14 and the lens barrel 15. Here, curved cover plate portions 19c, 19c are mounted on the standing plate portions 19b, 19b of a pair of the intermediate holding members 19, 19. With this construction, dust and dirt which enter into the gap between the lens barrel 14 and the lens barrel 15 can be prevented, and it is also possible to prevent that the reflected light by the exposure from the manuscript side enters into the lens groups from the gap between the lens barrel 14 and the lens barrel 15.

In this third embodiment, the cover plate portions 19c, 19c are respectively formed on a pair of the standing plate portions 19b, 19b; however, the cover plate portion may be formed on one of the standing plate portions to cover the gap.

Figure 13:
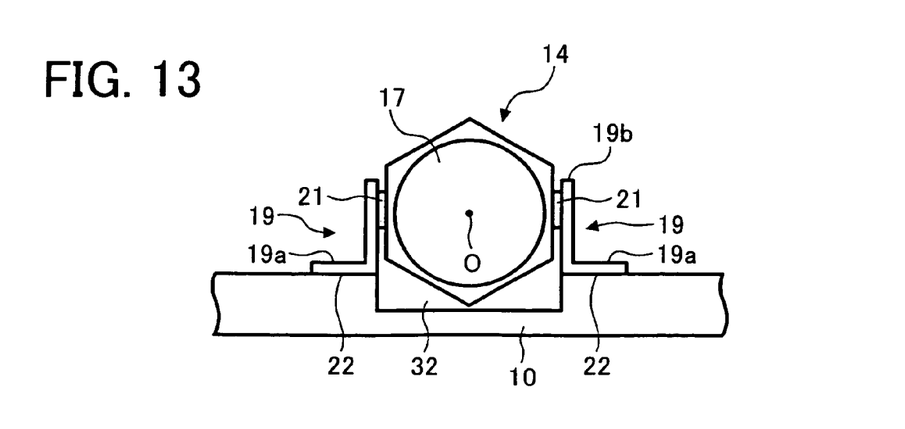
FIG. 13 is a front view illustrating a schematic structure of fourth embodiment of an image scanning unit according to the present invention.

FIG. 13 illustrates the fourth embodiment of the image scanning unit according to the present invention. In the image scanning unit according to this embodiment, the circumference portion of the lens barrel 14 when the lens barrel 14 is seen as the cross-section surface on the plane orthogonal to the optical axis O of the imaging lens system 16 can be adopted as a polygon shape. Here, the circumference surface of the lens barrel 14 is adopted as a regular hexagonal form. According to the lens barrel 14, the film thickness of the ultraviolet-curing adhesive 21 between the standing plate portion 19b and the circumference portion of the lens barrel 14 can be equalized. It is also convenient that the position in the turning direction of the lens barrel 14 can be set for a predetermined angle. At this point, the circumference surface of the lens barrel 14 is adopted as the regular hexagonal form; however, other forms such as a regular triangular form, a regular rectangular form, a regular pentangular form, and a regular heptangular form can be adopted; i.e. it is preferable for the circumference surface of the lens barrel 14 to be a regular polygon form.

It is more preferable for the regular polygon form to have even number of the number of the corners. If the number of the corners is even number, the adhesion surface of the intermediate holding members 19, 19 becomes parallel when fixing the lens barrel 14. Further, if the number of the corners is adopted an multiples of 4, the upper surface and the bottom surface of the lens barrel 14 can be adopted as flat surfaces. The length in the up and down directions of the lens barrel 14 can be shortened, and the thickness of the image scanning unit (scanner) can be reduced.

Figure 14:
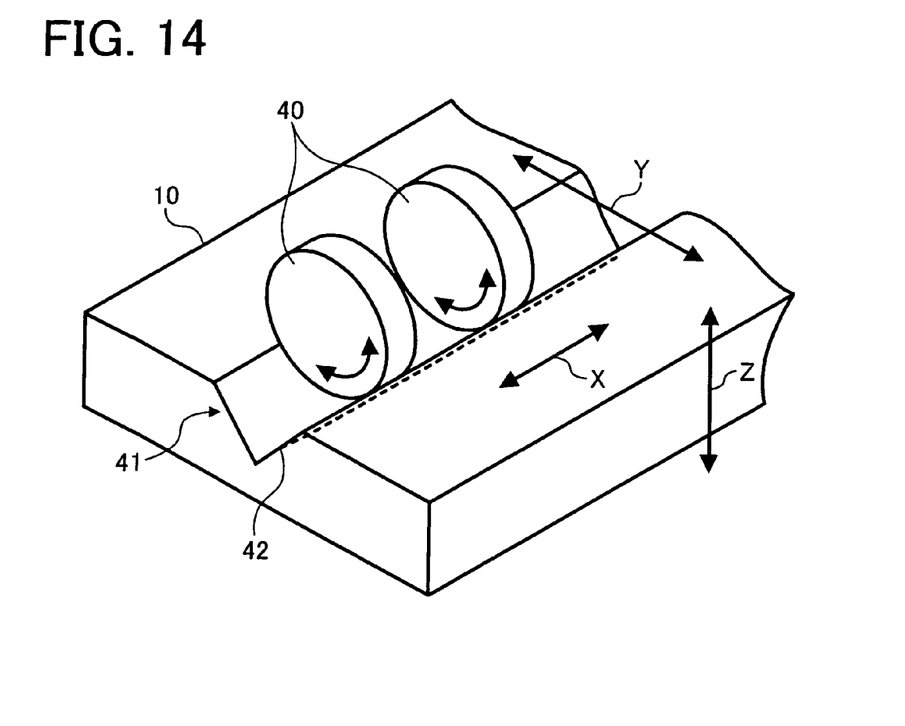
FIG. 14 is a perspective view illustrating a schematic structure of fifth embodiment of an image scanning unit according to the present invention.

FIG. 14 illustrates the fifth embodiment of the image scanning unit according to the present invention. In this embodiment, the same reference numerals are given for the portions same as the above embodiments. The image scanning unit according to this embodiment comprises an imaging lens including a plurality of lens groups 40 for imaging an image reflected from a manuscript, a photoelectric conversion element 11 for photo-electrically converting the manuscript image imaged on the lens groups, a base member 10 for holding a plurality of lens groups 40 and the photoelectric conversion element 11, and a positioning mechanism 41 capable of positioning each position of the lens groups along the base member 10. The photoelectric conversion element 11 is not shown in FIG. 14.

At least one of lens groups 40 is made of a naked lens group. In FIG. 14, two lens groups are naked.

The positioning mechanism 41 can adjust the distance of a plurality of lens groups 40 and positions of a plurality of lens groups 40 with respect to the photoelectric conversion elements 11. More particularly, the naked lens groups 40 are disposed on a V shaped guide groove 42 provided on the base member 10, for example. The movement of the each lens group in the Y direction shown in FIG. 14 is controlled by this V shaped guide groove, but the each lens group can move along the guide groove 42 in the X direction perpendicular to the Y direction. The Y direction is the parallel direction with respect to the photoelectric conversion element 11, and the X direction is the direction which approaches to the photoelectric conversion element 11 and secedes from the photoelectric conversion element 11. The position between the lens group and the photoelectric conversion element 11 in the Z direction shown in FIG. 14, which is the thickness direction of the base member 10 is appropriately set by forming the guide groove 42 and installing the photoelectric conversion element 11 on the base member 10 in order to align the optical axis of the lens group 40 and the optical axis of the photoelectric conversion element 11. The lens group is thereby positioned in the biaxial direction with respect to the photoelectric conversion element 11 by the positioning mechanism 41.

If the lens groups 40 are positioned with respect to the distance between the two lenses groups and the photoelectric conversion element 11, these lens groups are fixed onto the base member 10 by a suitable adhesive member. As a fixing device for this lens groups, an appropriate bracket, etc. can be used in addition to the adhesive member. Here, the lens group indicates one unit of lens in terms of constructing the imaging lens. For example, one lens group is considered as one glass ball lens, a cemented lens in which independently formed several lenses are commented, or the like.

In this embodiment, the imaging lens is composed of a lens barrel which holds two lens groups and two lens groups without being held by the lens barrel, i.e. two naked lens groups, for example.

The naked lens groups can be turned on the guide grove 42 in this embodiment.

Figure 15:
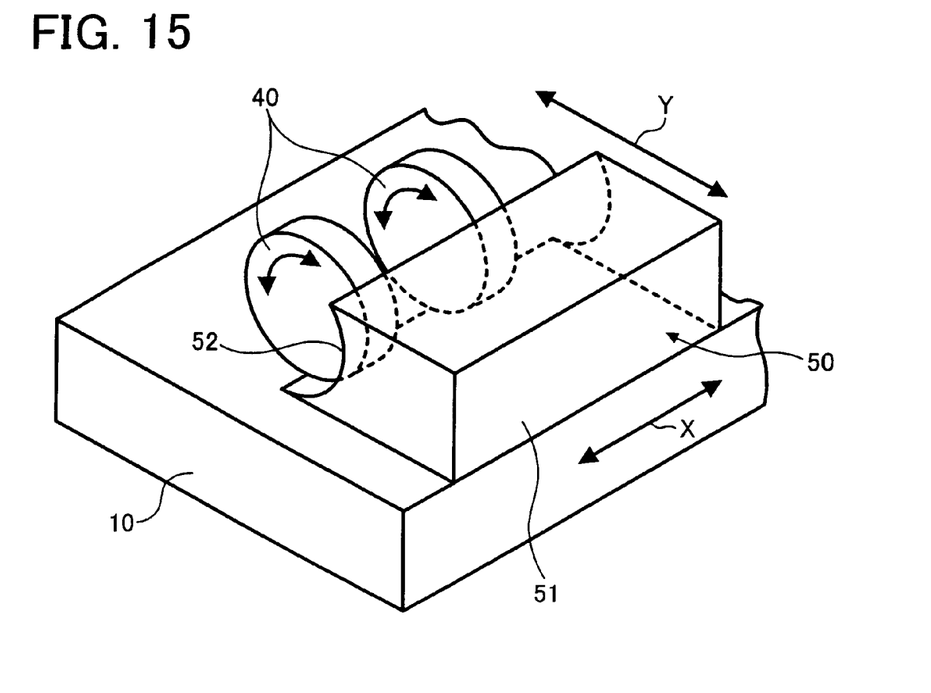
FIG. 15 is a perspective view illustrating a schematic structure of sixth embodiment of an image scanning unit according to the present invention.

FIG. 15 shows the sixth embodiment of the image scanning unit according to the present invention. The image scanning unit in this embodiment comprises lens groups in which a part of the lens groups is naked lens groups, and the other part of the lens groups is the lens groups held by the lens barrel. The naked lens groups in a plurality of lens groups 40 are adopted to be positioned by a positioning mechanism 50. The positioning mechanism 50 comprises an elongated positioning member 51 of cross-section rectangular shape extending in the X direction and a substantially semicircle shape formed on the surface facing to the lens groups 40 of the positioning member. The naked lens groups are movable along the guide groove 52, and the distance between the lens groups and the position with respect to the photoelectric conversion element are thereby adjustable. As described above, by the positioning mechanism, one or more naked lens groups are adjustable along the base member, with respect to the lens groups held by the lens barrel and the photoelectric conversion element. The naked lens groups are fixed onto the base member 10 or the positioning member 51 by an appropriate adhesive member after the positioning.

In the above embodiment, the lens barrel is adjustably fixed onto the base member 10 by using any fixed band (not shown).

According to the present invention, the turning of the lens barrel and the distance adjustment between the lens barrels can be independently conducted with the simple structure of the lens barrel without being complicated, so that an image quality can be improved while preventing an influence caused by the decentralizing of lens when adjusting the distance between the lenses.

Moreover, the position of the naked lens group can be adjusted by freely moving with respect to the photoelectric conversion element and the like, so that an image scanning unit having extremely simple structure and easy assembly can be provided.

What is claimed is:

1. An image scanning unit, comprising:
   an imaging lens including a plurality of lens groups for imaging a reflected image of a manuscript;
   a photoelectric conversion element for photo-electrically converting the image of the manuscript imaged by the imaging lens;
   a base member for holding the imaging lens and the photoelectric conversion element; and
   a positioning mechanism capable of positioning at least one of the plurality of lens groups in a biaxial direction along the base member,
   at least one of the plurality of lens groups comprising a naked lens group, the positioning mechanism being adjustable to position at least one of the plurality of lens groups relative to the other lens group or the photoelectric conversion element,
   wherein at least one of the naked lens group and the lens group held by the lens barrel is configured to rotate in a circumference direction and is fixed onto the base member by the positioning mechanism.

2. An image scanning unit, comprising:
   an imaging lens including a plurality of lens groups for imaging a reflected image of a manuscript;
   a photoelectric conversion element for photo-electrically converting the image of the manuscript imaged by the imaging lens;
   a base member for holding the imaging lens and the photoelectric conversion element; and
   a positioning mechanism capable of positioning at least a part of the plurality of lens groups in a biaxial direction along the base member,
   at least a part of the lens groups comprising a naked lens group,
   the other part of the lens groups comprising a lens group held by a lens barrel,
   the positioning mechanism being adjustable to position the naked lens group relative to the photoelectric conversion element or the lens group held by the lens barrel,
   wherein at least one of the naked lens group and the lens group held by the lens barrel is configured to rotate in a circumference direction and is fixed onto the base member by the positioning mechanism.

3. The image scanning unit according to claim 1 or claim 2, wherein circumference surfaces of the naked lens group and the lens group held by the lens barrel are supported by the base member and are held by the positioning mechanism, and the naked lens group and the lens group held by the lens barrel are set to have the same radius from optical axes of the lens groups to the circumference surfaces.

4. The image scanning unit according to claim 1 or claim 2, wherein at least one of the naked lens group and the lens group held by the lens barrel is fixed onto the base member without adjusting the position, and a position of at least one of the naked lens group and the lens group held by the lens barrel is adjusted and is fixed onto the base member by the positioning mechanism.

5. An image forming apparatus comprising:
   an image scanning unit including an imaging lens including a plurality of lens groups for imaging a reflected image of a manuscript;
   a photoelectric conversion element for photo-electrically converting the image of the manuscript imaged by the imaging lens;
   a base member for holding the imaging lens and the photoelectric conversion element; and
   a positioning mechanism capable of positioning at least one of the plurality of lens groups in a biaxial direction along the base member,
   at least one of the plurality of lens groups comprising a naked lens group, the positioning mechanism being adjustable to position at least one of the plurality of lens groups relative to the other lens group or the photoelectric conversion element,
   wherein at least one of the naked lens group and the lens group held by the lens barrel is configured to rotate in a circumference direction and is fixed onto the base member by the positioning mechanism.

6. An image scanning unit, comprising:
   at least two lens groups for imaging a reflected image of a manuscript on a lined photoelectric conversion element;
   lens barrels for holding the lens groups, respectively, and constituting an imaging lens system;
   a base member on which the lined photoelectric conversion element and the lens barrels are disposed; and an intermediate holding member for mounting at least one of the lens barrels and the lined photoelectric conversion element on the base member, wherein the intermediate holding member comprises a pair of intermediate holding members, wherein the pair of intermediate holding members includes base plate portions and standing portions, the at least one lens barrel is adhered to each of the pair of standing portions, and the at least one lens barrel is fixed in a floating state relative to the base member, and wherein a line connecting the adhered spots of the lens barrel by the pair of intermediate holding members passes the center of gravity of the lens barrel and is orthogonal to an optical axis of the lens.

7. An image scanning unit, comprising:

at least two lens groups for imaging a reflected image of a manuscript on a lined photoelectric conversion element;

lens barrels for holding the lens groups, respectively, and constituting an imaging lens system;

a base member on which the lined photoelectric conversion element and the lens barrels are disposed; and an intermediate holding member for mounting at least one of the lens barrels and the lined photoelectric conversion element on the base member, wherein the intermediate holding member comprises a pair of intermediate holding members, wherein the pair of intermediate holding members includes base plate portions and standing portions, the at least one lens barrel is adhered to each of the pair of standing portions, and the at least one lens barrel is fixed in a floating state relative to the base member, and wherein each of the intermediate holding members includes a cover plate portion for covering a gap between the lens barrels.

* * * * *